United States Patent [19]
Alessio

[11] Patent Number: 5,336,978
[45] Date of Patent: Aug. 9, 1994

[54] DRIVE CIRCUIT FOR ELECTROLUMINESCENT LAMPS

[76] Inventor: David S. Alessio, 10 Buckley La., Prospect, Conn. 06712

[21] Appl. No.: 793,847

[22] Filed: Nov. 18, 1991

[51] Int. Cl.[5] .............................. G09G 3/10
[52] U.S. Cl. ..................... 315/169.3; 315/209 R; 315/156; 315/158; 315/307; 315/246; 363/132
[58] Field of Search ............ 315/169.3, 246, 291, 315/307, 158, 156, 209 R, 219; 313/498; 363/132

[56] References Cited
U.S. PATENT DOCUMENTS 4,527,096  7/1985  Kindlmann .................... 315/226
5,055,993  10/1991  Miyata et al. ................... 315/219
5,089,748  2/1992  Ihms ............................. 315/158

Primary Examiner—Robert J. Pascal
Assistant Examiner—Michael B. Shingleton
Attorney, Agent, or Firm—Chilton, Alix & Van Kirk

[57] ABSTRACT

A drive circuit for an electroluminescent lamp and a novel lamp are disclosed. The drive circuit generates an alternating output voltage which is variable in magnitude and frequency and which may be subjected to automatic closed loop regulation in response to lamp voltage or the intensity of the light generated by the lamp. The electroluminescent lamp includes an integral light sensor for producing signals commensurate with the intensity of the light generated by the lamp.

10 Claims, 8 Drawing Sheets

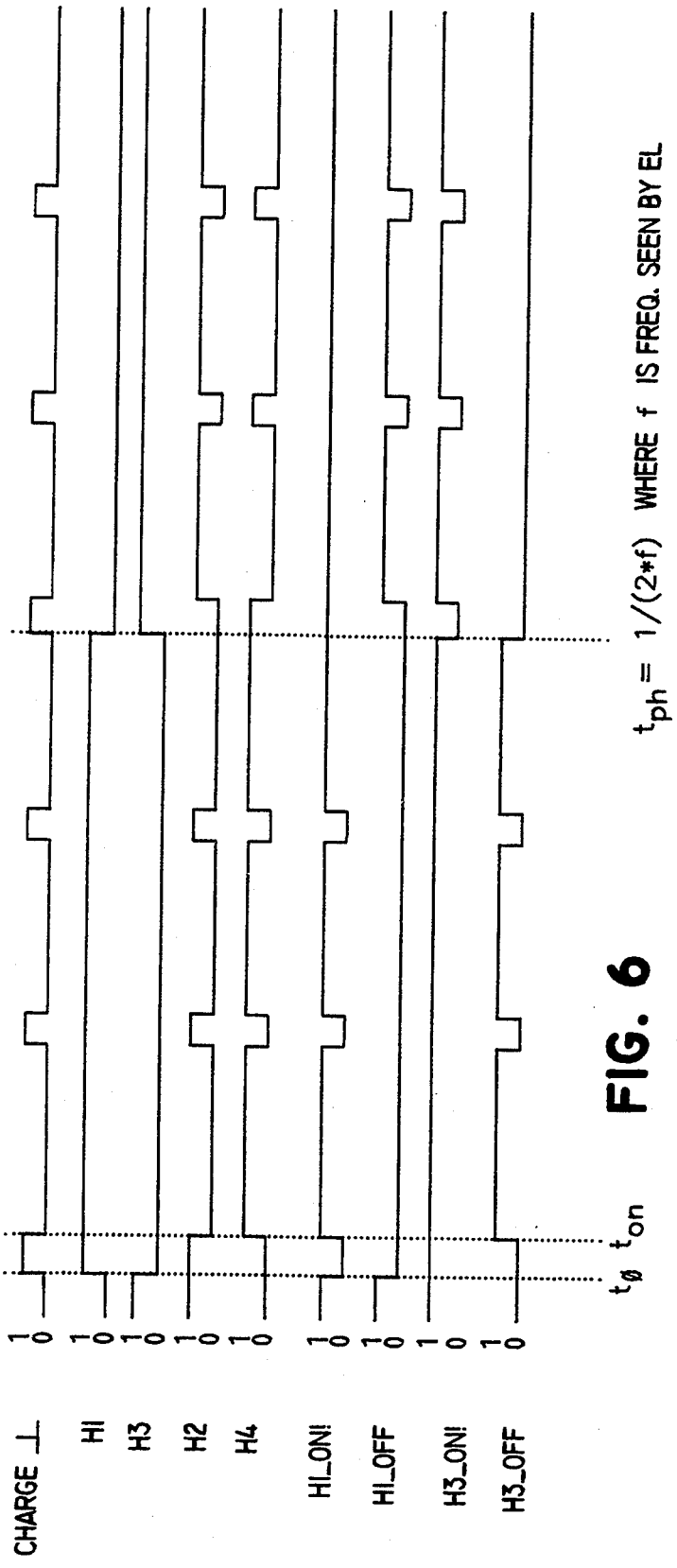

DRIVE CIRCUIT FOR ELECTROLUMINESCENT LAMPS

BACKGROUND OF THE INVENTION

1. Field of the Invention

The present invention relates to the exercise of control over the voltage applied to a capacitive load, a light emitting capacitor for example, and particularly to the energization of electroluminescent lights. More specifically, this invention is directed to a drive circuit for an electroluminescent (EL) display and particularly to an EL lamp driver for generating an alternating output voltage which is variable in magnitude and frequency. Accordingly, the general objects of the present invention are to provide novel and improved methods and apparatus of such character.

2. Description of the Prior Art

Drive circuits for EL lamps are well known in the art. For examples of such prior art lamp drives, reference may be had to U.S. Pat. No. 5,066,895 and U.S. Pat. No. 4,845,489. For a discussion of the construction and utility of EL lamps, reference may be had to U.S. Pat. No. 5,066,895.

An EL lamp is a light-emitting device which appears to the circuit supplying energy thereto as a capacitive load. During the service life of an EL lamp, the capacitance thereof will decrease with age. As the capacitance decreases with age, the capacitive reactance will also vary thus causing the output frequency of the lamp driver to change. Within its operating range, the brightness of an EL lamp will vary directly with frequency and thus will also tend to increase with age. However, the color of the light generated by an EL lamp will also vary with frequency and for many applications a change in color is undesirable and/or unacceptable. Further, the current drain imposed on the drive circuit will also increase with frequency and for many operating environments, particularly where the power supply is a battery, such an increase in power consumption is unacceptable.

It is also to be noted that, if the frequency of the drive voltage applied to an EL lamp is constrained to be constant, the color will remain the same but the intensity of the light produced by such a lamp will diminish as the electrical characteristics of the lamp vary with age. Further, if drive voltage frequency is not held constant, the increased brightness incident to allowing the frequency of the drive voltage to increase as the capacitance decreases does not fully compensate for the reduction in total output intensity per unit area. The intensity of an EL lamp is a function of the voltage applied thereto.

The prior art EL lamp drivers and drive techniques did not offer a total solution to the operational problems resulting from the above-discussed change in lamp characteristics with age. Particularly, the prior art did not permit the independent adjustment of the output voltage and output frequency of an EL lamp driver. Also, prior EL lamp drivers did not provide an output voltage and output frequency which were independent of the load, i.e., the physical size of the lamp. A further significant deficiency of the prior art resided in an inability to exercise control over the lamp driver so as to obtain a constant "brightness" over the life of an EL lamp. Yet another deficiency of prior art EL lamp drivers was their relatively large size which resulted from the use of a transformer.

SUMMARY OF THE INVENTION

The present invention overcomes the above briefly discussed and other deficiencies and disadvantages of the prior art by providing a unique method and apparatus for energizing an electroluminescent lamp. The apparatus of the invention is characterized by closed-loop regulation of the intensity of the light generated by an electroluminescent lamp and/or by regulation of the output voltage of the lamp driver. This apparatus is further characterized by the ability to independently adjust lamp driver output voltage and output frequency. Also, the output voltage and output frequency of an EL lamp driver in accordance with the invention are independent of the size of the lamp being driven and, within the limits of operation of the driver, are also independent of the supply voltage. The lamp driver of the invention additionally has the capability of surviving either an open circuited or short circuited load for an indefinite period of time.

A lamp driver in accordance with the present invention comprises an energy storage device and a switching network, power being delivered to the EL lamp load from the energy storage device via the switching network. The circuitry which generates the control signals for the switching network includes a pulse width modulated oscillator. At least one technique of closed loop regulation of the operation of the switching network is provided. The closed loop regulation may encompass the feedback of a signal commensurate with the voltage applied to the lamp and/or the light actually produced by the lamp.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 2 is a truth table for the switching network of the driver of FIG. 1;

FIG. 6 is a waveform diagram showing the control signals generated by the control circuitry of FIG. 6;

DESCRIPTION OF THE DISCLOSED EMBODIMENT

Figure 1:
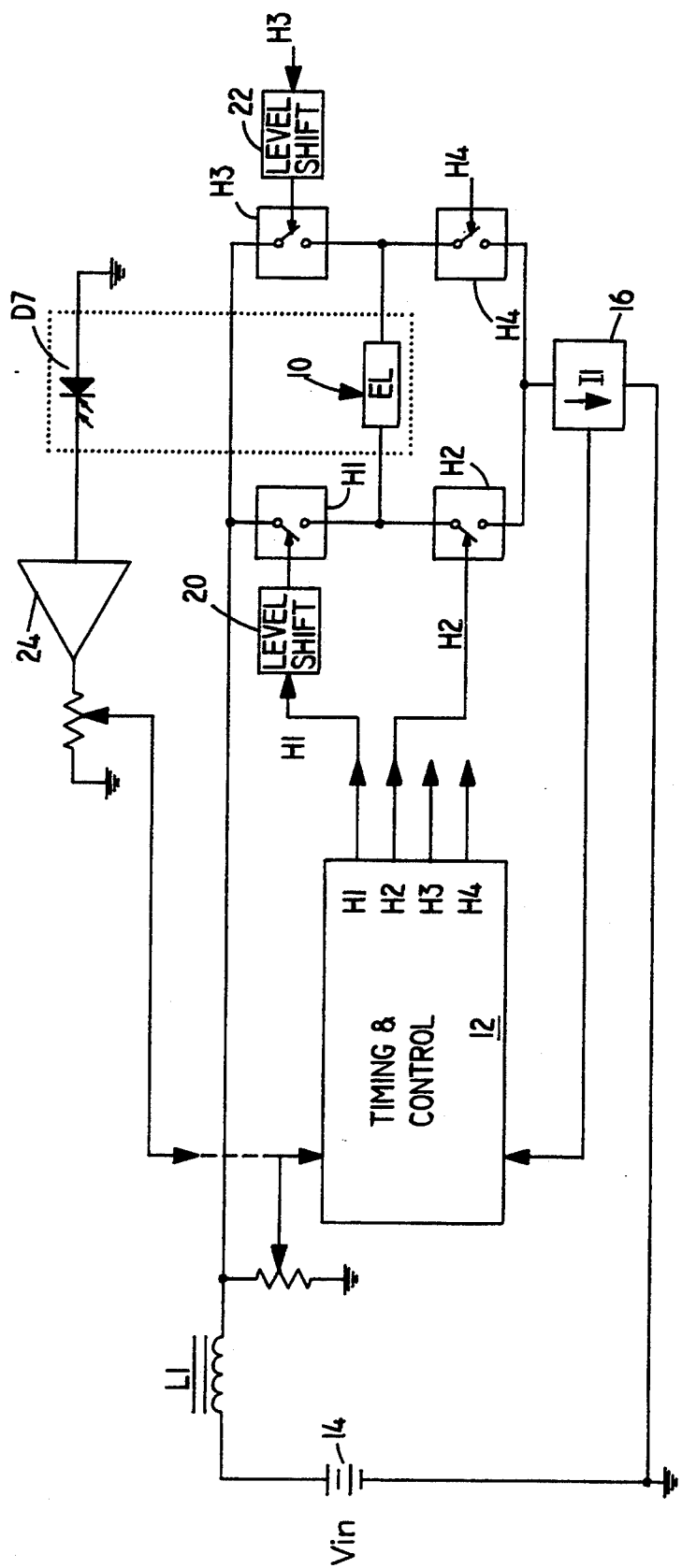
FIG. 1 is a circuit block diagram of a driver for an electroluminescent lamp in accordance with the present invention.

Referring to FIG. 1, a driver for an electroluminescent lamp, the lamp being indicated generally at 10, comprises timing and control circuitry, indicated generally at 12. The control circuit 12 provides gating control signals for solid state switches H1, H2, H3 and H4. The switches H1–H4 and the EL lamp 10 are interconnected to define an "H" shaped switching network which is connected in series with an inductor L1. This series connection of inductor and switching network, the switching network including the EL lamp capacitive load as noted above, is connected across a source of DC power which has been represented by a battery 14. In the disclosed embodiment, the series circuit connected across the power source 14 preferably also includes a current sensor 16. The current sensor 16 provides short circuit protection by generating a signal which, after processing, will be employed to latch switches H2 and H4 in the open state should excessive current be drawn from source 14. Similar disabling of the switching network may be caused in response to an over-temperature condition or in response to the voltage of source 14 falling below a predetermined minimum level.

Figure 3A:
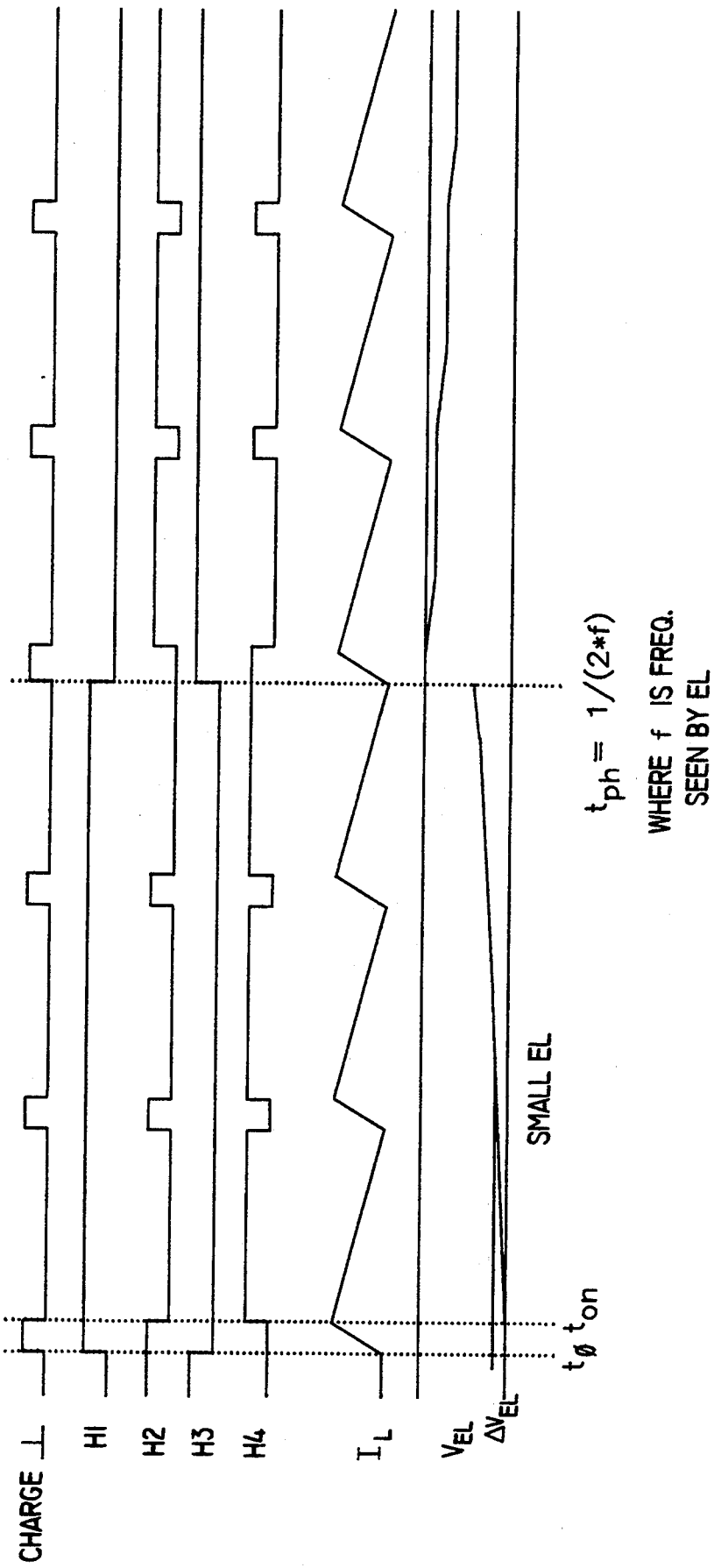
FIGS. 3A and 3B respectively comprise waveform diagrams which depict the switch control signals of the driver of FIG. 1 and the resulting load current and voltage.
Figure 3B:
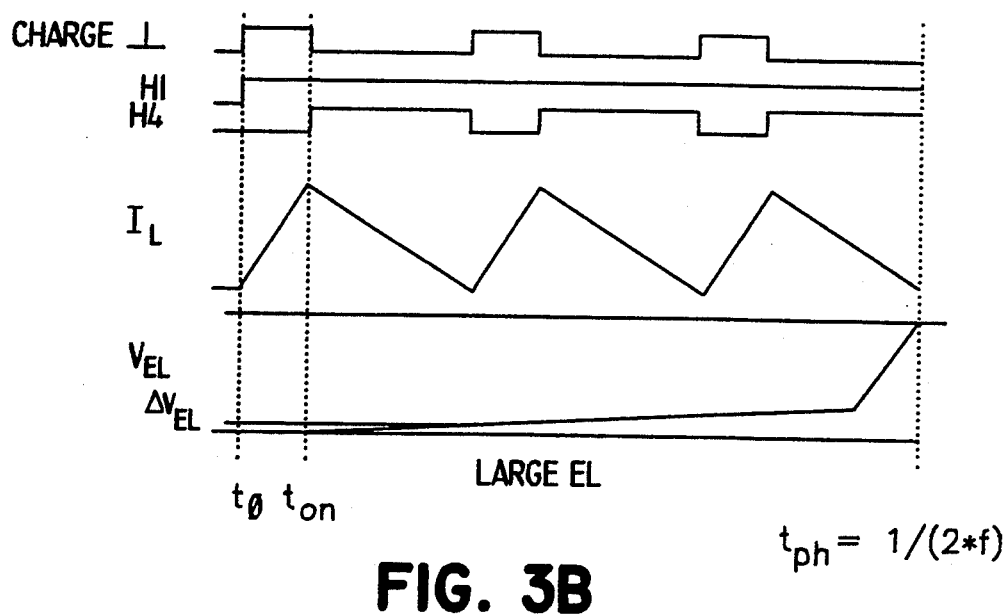
Figure 4:
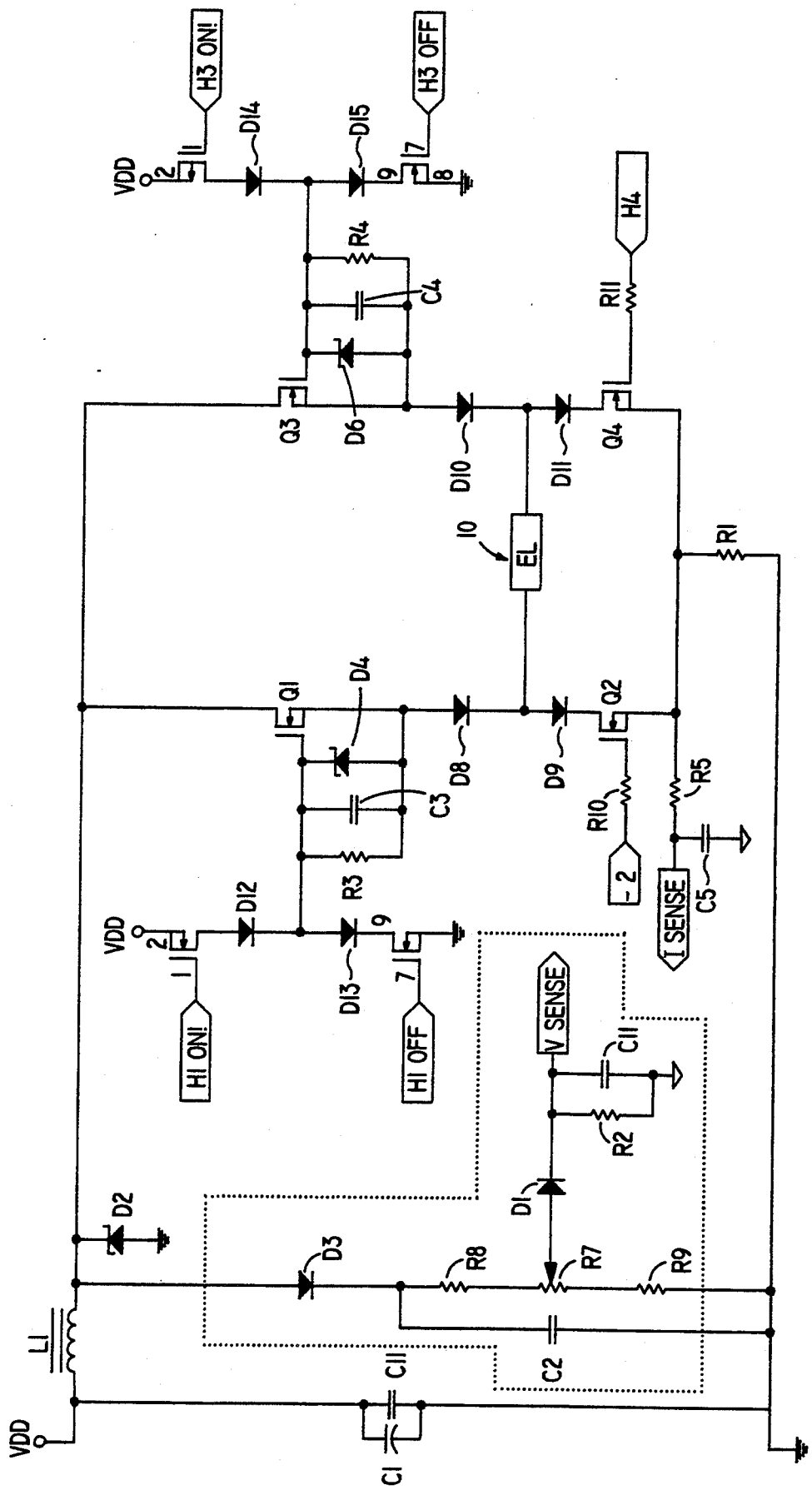
FIG. 4 is a schematic diagram of a switching network of a preferred embodiment of the driver of FIG. 1.
Figure 5A:
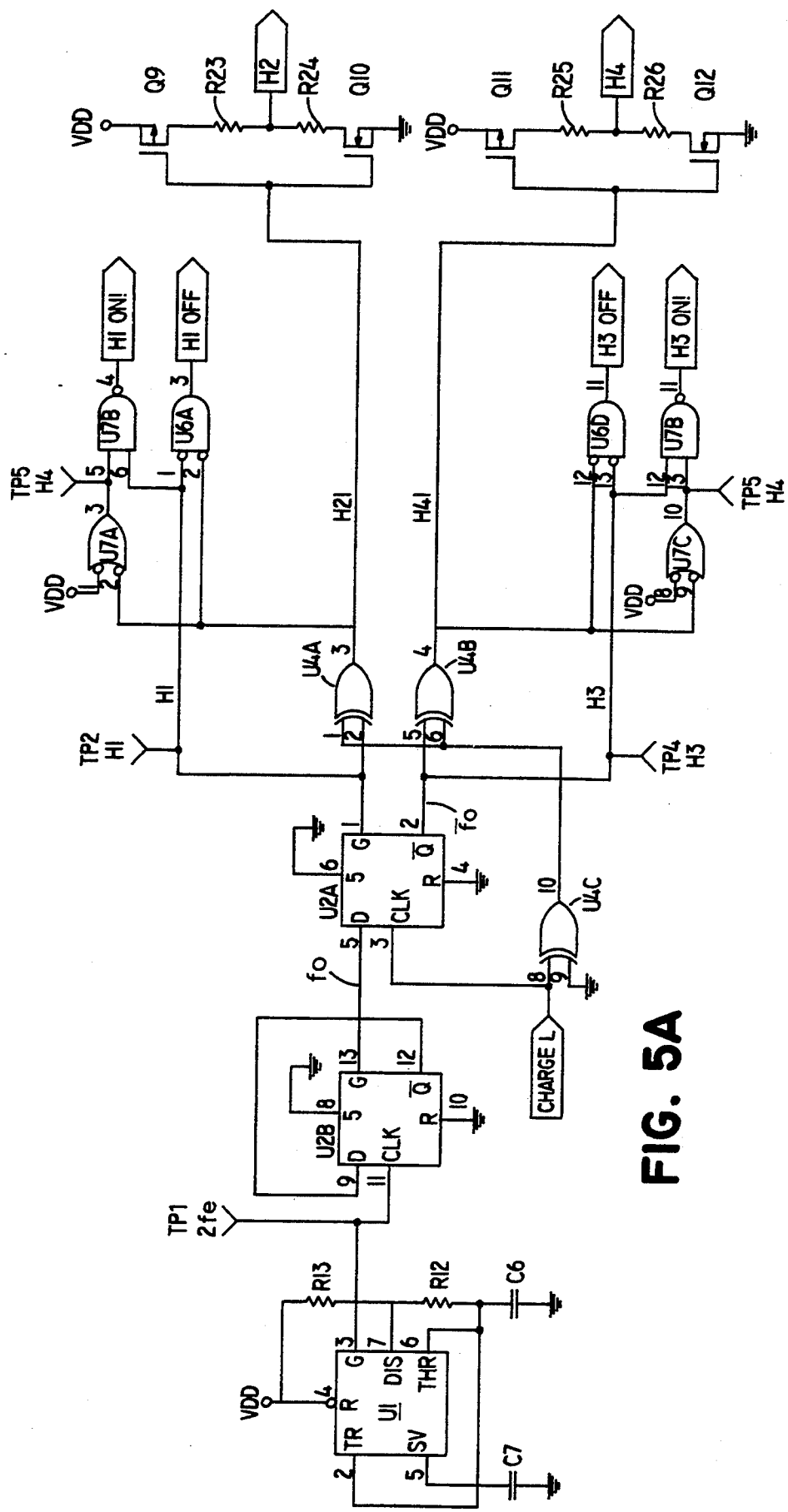
FIGS. 5A and 5B are schematic diagrams of the timing and control circuitry of a preferred embodiment of the driver of FIG. 1.
Figure 5B:
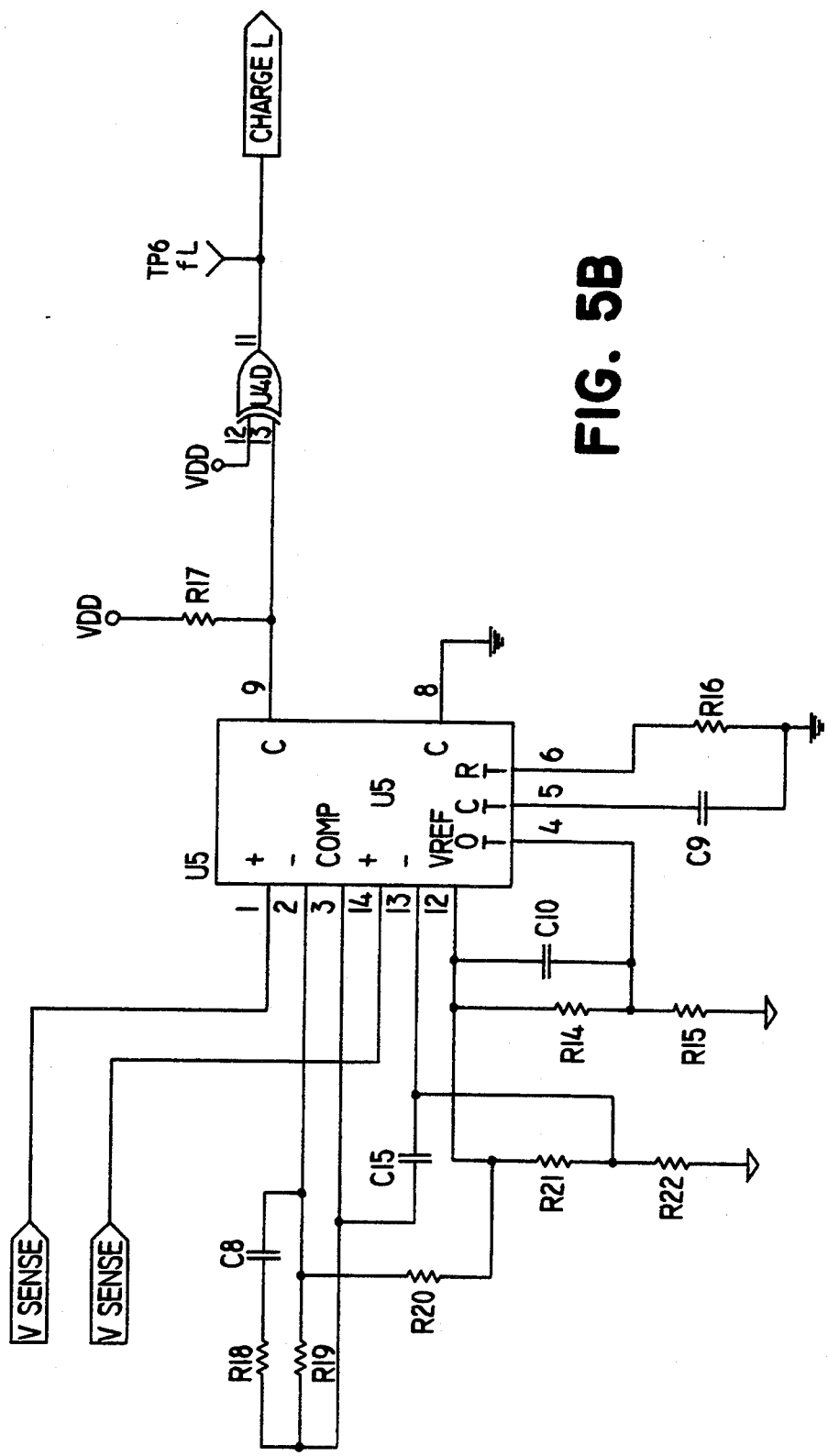

A preferred timing and control circuit 12 is shown schematically in FIG. 5 while a preferred switching network is shown schematically in FIG. 4. Before describing FIGS. 4 and 5, the operation of the driver as depicted in FIG. 1 will be explained by reference to FIGS. 2 and 3. FIG. 2 is a "TRUTH TABLE" which represents the state of the switches H1–H4. In FIG. 2, the closed state of a switch is indicated by "1" and the open state of a switch is indicated by "0". Also, "Phase A" represents the first half of the cycle of the alternating current delivered to the EL lamp load 10 whereas "Phase B" is the second half of the cycle, i.e., current flow through the capacitive load will be in opposite directions during "Phase A" and "Phase B".

It will be presumed, for purposes of explaining operation of the driver, that switches H1 and H2 are initially closed and switches H3 and H4 are initially open. If the series resistance of inductor L1 and the solid state switches is ignored, a current $I_L$ is introduced and flows through inductor $L_1$ and the closed switches H1 and H2 according to:

$$I_L = \frac{V_{in}}{L_1} t \quad (1)$$

After a time ($t_{on}$) determined by the control circuitry, switch H2 will be opened as switch H4 is closed. The current stored in the inductor is now forced to flow through the EL lamp. The energy stored in inductor $L_1$ at the instant switch H2 opens and switch H4 closes is:

$$W_L = \frac{V_{in}^2}{2L_1} t_{on}^2 \quad (2)$$

This energy is transferred to the EL lamp 10, which is a "lossy" capacitor, causing an increase in voltage $V_{EL}$ across the lamp. If the EL lamp were an ideal capacitor with capacitance $C_{EL}$, then the change in voltage would be:

$$\Delta V_{EL} = \frac{V_{in}}{\sqrt{L_1 C_{EL}}} t_{on} \quad (3)$$

Although equation (3) neglects energy-loss in the lamp, in the form of heat, vibration and generated light, this formula clearly shows the relationship between $\Delta V_{EL}$ and $t_{on}$. The operation of switches H2 and H4 continues in this manner for a time ($t_{ph}$). At time $t_{ph}$ the EL lamp 10 will have reached its peak voltage of $V_{EL-pk}$. At this point in time, switch H1 opens and switch H3 closes and the roles of switches H2 and H4 are now reversed. Switch H4 is closed causing a current to flow through inductor $L_1$ and switches H3 and H4 for a period of time $t_{on}$, after which switch H4 opens as switch H2 closes causing this current to flow through the EL lamp in the opposite direction. Accordingly, the voltage $\Delta V_{EL}$ becomes:

$$\Delta V_{EL} = \frac{-V_{in}}{\sqrt{L_1 C_{EL}}} t_{on} \quad (4)$$

Thus, the lamp 10 is charged in the opposite direction.

The foregoing mode of operation will be apparent to and understood by those skilled in the art by reference to the TRUTH TABLE of FIG. 2, and particularly by comparison of the state of the switches during "Phase A" and "Phase B" considered in combination with the wave forms of FIG. 3.

As depicted in FIG. 3B, $V_{EL}$ increases in a generally linear fashion during the first half-cycle of the driver output voltage. During this increase, $dV_{EL}/dt$ is minimized by pulsing the current, i.e., by toggling switch H4 while switch H1 remains in the conductive state. This drive mode may be contrasted with the prior art where a sinusodial voltage is applied across the lamp.

FIG. 3A also depicts, by means of a series of wave forms, the operation of a "small" electroluminescent lamp load. The lower wave forms, provided only for the first half-cycle, represent the manner in which the operation of the driver will be varied in the case of a larger EL lamp load. Thus, in the case of a large load, the width of the control pulses applied to switches H2 and H4 is modified such that the duration of the DC current flow through inductor L1 is extended whereby the peak inductor current will be increased and the energy stored in the inductor at the instant switch H2 is opened will be increased.

It will be understood by those skilled in the art that the wave forms of FIG. 3 represent an idealized condition. In actual fact, $I_L$ will not decrease linearly.

Referring now to FIG. 4, the switches H2 and H4 respectively comprise field-effect transistors Q2 and Q4. The switches H1 and H3 are respectively defined by FET's Q1 and Q3 which have respective Zener diodes D4 and D6 connected between their gates and sources. FET's Q2 and Q4 are directly switched by control pulses provided, in the manner to be described below, by the timing and control circuit 12. FET's Q1 and Q3 are controlled by circuit 12 through respective level shifters 20 and 22 (see FIG. 1). These level shifters each comprise a pair of further FET's; namely Q5 and Q6 in the case of level shifter 20 and Q7 and Q8 in the case of level shifter 22. The level shifters 20 and 22 change the logic level of the gating signals relative to ground potential as required to switch the associated FET.

Referring now to FIG. 5, a free-running oscillator U1, which may be a type 555 timer, generates a pulse train. The output of timer U1 is delivered to a frequency divider U2B which produces a clock signal at a frequency ($f_o$) with exactly a 50% duty cycle and on-time of $t_{ph}$.

An integrated circuit U5, which in one reduction to practice comprised a Motorola type 34060 comparator, includes an oscillator which generates an output signal with a fixed frequency $f_L$ ($f_L >> f_o$). The output signal from U5 is inverted by an inverter U4D which also sharpens the edges of the timing pulses $f_L$ produced by the open-collector output of U5. The output of inverter U4D forms the clock frequency "Charge_L" (see FIGS. 2, 3 and 6) that operates switches H2 and H4.

A multivibrator circuit U2A synchronizes the pulses at clock frequency $f_o$, which appear at the output of divider U2B, with the Charge_L signal. Circuit U2A provides, at its Q and $\overline{Q}$ output terminals, the synchronized $f_o$ pulse train and its complement $\overline{f_o}$ for controlling operation of switches H1 and H3. Gates U4A and U4B, in response to the $f_o$ and $\overline{f_o}$ signals and the output of a further gate U4C, produce the timing signals for switches H2 and H4 respectively, namely the H2! and H4! signals (FIG. 6).

FET pairs Q9, Q10; and Q11, Q12 form inverters with enough current drive to switch FET's Q2 and Q4. Resistors R10 and R11, which are respectively in series with the gates of FET's Q2 and Q4 (see FIG. 4), prevent transmission line ringing while also limiting gate current. Diodes D8–D11 prevent the intrinsic diodes of the FET's, namely the substrate PN junction of Q1–Q4, from becoming forward biased.

FET Q1 is turned on by turning on FET Q5 simultaneously with FET Q2. Conduction of FET Q1 causes capacitor C3 to charge to nearly $V_{DD}$ (the source voltage). The charge on C3 will thereafter bias Q1 into the conductive state while Q2 is non-conductive and Q4 is in the conductive state. Accordingly, once turned on, FET Q1 will remain in the conductive state until the next time FET Q2 is gated on. FET Q1 is turned off by removing the charge on capacitor C3. Capacitor C3 is discharged by turning FET Q6 on simultaneously with Q2. This occurs when Q2 is on and the source of Q1 is at virtual ground potential, and results in Q6 defining a discharge path for C3.

The operation of FET switch Q3 is identical to that described above for switch Q1, i.e., the charge on capacitor C4 keeps Q3 turned on as Q2 toggles, and thus will not be separately described.

The timing signals for FET's Q5–Q8 are produced by gating circuits U6 and U7 in the manner which will be obvious from joint consideration of FIGS. 5 and 6. Diodes D12–D15 prevent the substrate PN junctions of Q5–Q8 from becoming forward biased. Diodes D4 and D6 limit the $V_{GS}$ of FET's Q1 and Q3 to a safe operating level.

Referring again to FIG. 4, the voltage seen at the anode of diode D3 is the absolute value of $V_{EL}$. Zener diode D2 limits this voltage to a safe operating range and provides output open-circuit protection, as described below. Diode D3 and capacitor C2 form a peak detector. Hence, the voltage across capacitor C2 is $V_{EL-pk}$. This voltage, divided down by a resistor network comprising resistors R7–R9 and further rectified and filtered by diode D1, resistor R2 and capacitor C11, provides a stable sense voltage V_SENSE which is proportional to the peak voltage seen by the lamp. V_SENSE is applied to the non-inverting input of a comparator on IC U5. The inverting input of this comparator is connected to an internal reference voltage (V_ref). If $V_{EL}$ falls, V_SENSE will fall, and U5 will increase the duty cycle ($t_{on}$) of the Charge_L timing signal to cause more energy to be stored in inductor $L_1$.

This has the effect of increasing $\Delta V_{EL}$ thus increasing the voltage across the lamp 10 to bring it back to its nominal peak value. Similarly if $V_{EL}$ rises, V_SENSE will rise, and U5 will decrease $t_{on}$ to maintain V_SENSE=V_ref. In this way, closed-loop regulation is maintained over the output voltage $V_{EL}$ of the driver.

Figure 7:
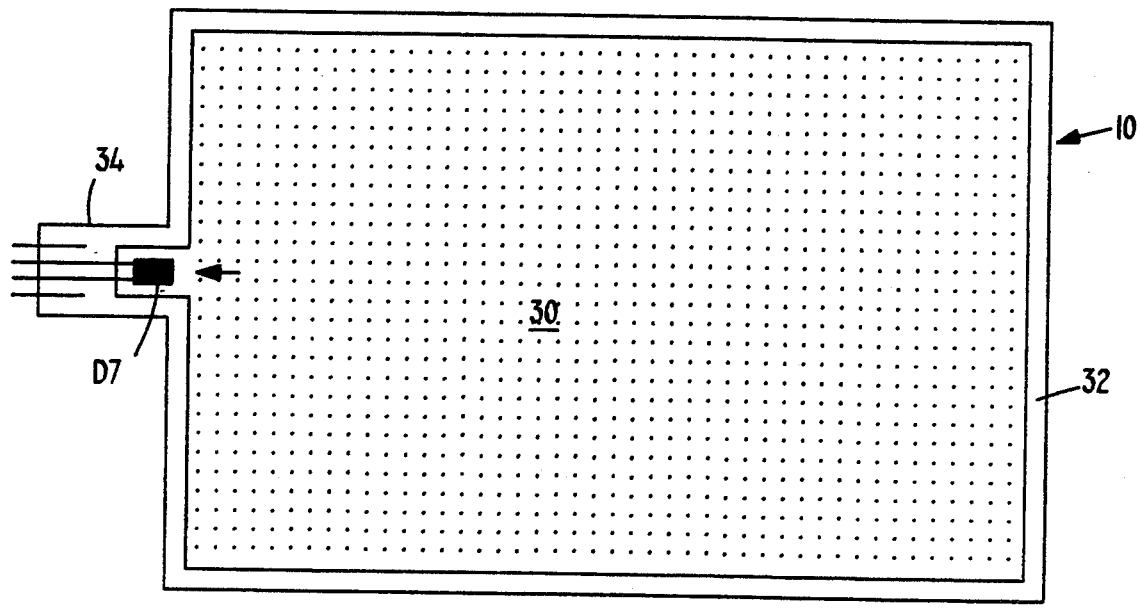
FIG. 7 is a schematic top plan view of an electroluminescent lamp with integral light sensor in accordance with the invention.
Figure 8:
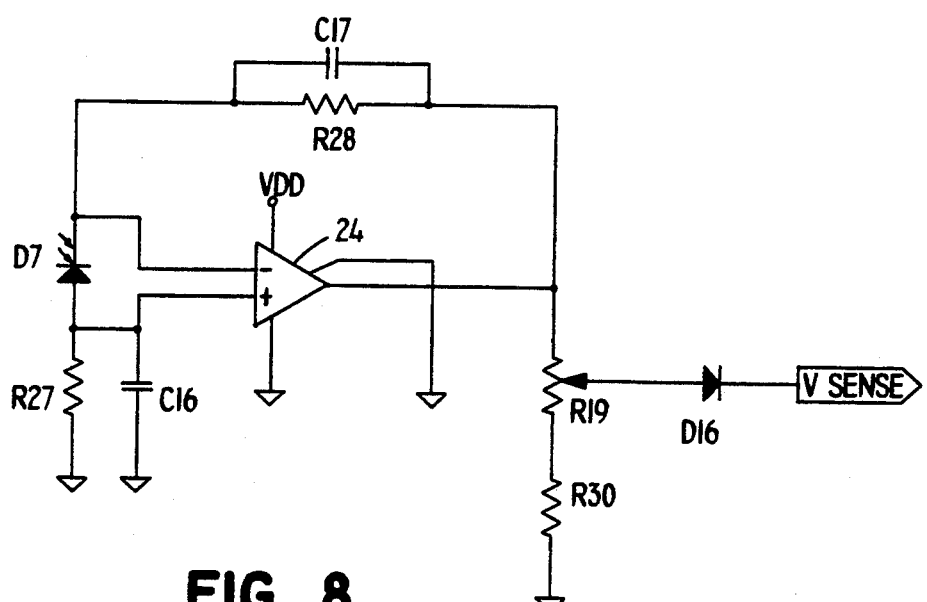
FIG. 8 is a schematic diagram of a feedback signal generator circuit for use in practice of the present invention.

If closed loop regulation of the intensity of the EL lamp 10 is desired, the circuit of FIG. 8 may be employed and the function of components D3, R7, R8, R9, C2, D1, D2 and C2 will be reduced to that of providing open output-circuit protection as described below. In the FIG. 8 circuit, the output of an operational amplifier 24 will be proportional to the intensity of the light seen by a photodiode D7 or other light sensitive device. The photodiode D7 must be optically coupled to the lamp 10, as schematically represented on FIG. 1, and may actually comprise a part of the lamp 10 as shown in FIG. 7. The output voltage from amplifier 24 is divided down by a resistor network comprising resistors R29 and R30 to form a stable voltage V_SENSE, which is fed to the non-inverting input of the comparator on U5 to produce the regulating action described above. In this way, closed-loop regulation is maintained over the intensity of light generated by the lamp.

Returning to a consideration of FIG. 4, the current $I_L$ flowing through the inductor $L_1$ is sensed by means of resistor R1. The voltage across R1 is proportional to $I_L$. This time-variant voltage is integrated, by an integrator circuit comprising R5 and C5, to form a voltage (I_SENSE) proportional to the average current through the EL lamp which, of course, is the average current through $L_1$. The I_SENSE voltage is applied to a second comparison circuit in comparator U5. This second comparison circuit in U5 will limit I_SENSE (by limiting $t_{on}$) to a maximum value determined by resistors R21 and R22. As described above, diode D2 limits the peak voltage generated by $L_1$ to a safe operating level. In the event of an open output-circuit, the upper limit of inductor voltage ($V_z$ of D2) is stored across C2. V_SENSE will be sufficiently greater than nominal causing U5 to limit $t_{on}$ to a minimal. At minimal $t_{on}$, any excess energy in $L_1$ will be absorbed by Zener diode D2.

Thus, as may be seen from Equations (3) and (4) above, U5 can vary $t_{on}$ to compensate for any fluctuations in $V_{IN}$ or changes in $C_{EL}$ with age.

In the typical application of the present invention, the user selects the desired color of the EL lamp output and this selection determines the output frequency of timer U1. Once selected, this frequency will remain constant throughout the life of the lamp, and the comparator U5 will vary the duty cycle of switches H2 and H4 to achieve closed-loop regulation of voltage $E_{EL}$ to maintain constant intensity.

Referring now to FIG. 7, an electroluminescent lamp is indicated generally at 10. Lamp 10 has a "working area" 30 which is defined by the coating(s) of phosphor. The working area 30 is surrounded by a border 32. The lamp 10 also has a tab area 34 which extends away from the working area. The tab area is provided to allow the requisite electrical connections to be made to the lamp electrodes (not shown). In accordance with the invention, the phosphor coating is extended into the tab area and the photosensitive device, for example the photodiode D7, is also mounted on the tab area. The photosensitive device will face the material which exhibits the electroluminescent phenomena and, because of this intimate optical coupling, will provide a signal commensurate with the intensity of the light generated by the lamp 10.

While a preferred embodiment has been shown and described, various modifications may be made thereto without departing from the spirit and scope of the invention. Accordingly, it is to be understood that the present invention has been described by way of illustration and not limitation.

What is claimed is:

1. Apparatus for providing electrical power to a capacitive load comprising:
    a source of direct current;
    a first solid state switch device, said first switch device having first and second terminals and conductive and non-conductive states, a current flow path being established between said terminals when said switch device is in the conductive state, said first switch device being responsive to gating control signals for switching between said states;
    a second solid state switch device, said second switch device having first and second terminals and conductive and non-conductive states, a current flow path being established between said terminals when said switch device is in the conductive state, said second switch device being responsive to gating control signals for switching between said states;
    first connecting means for connecting a capacitive load between said first terminals of said first and second switch devices;
    second connecting means for connecting said second terminals of said first and second switch devices to a first polarity terminal of said direct current source;
    a third solid state switch device, said third switch device having first and second terminals and conductive and nonconductive states, a current flow path being established between said terminals when said switch device is in the conductive state, said third switch device being responsive to gating control signals for switching between said states;
    fourth solid state switch device, said fourth switch device having first and second terminals and conductive and nonconductive states, a current flow path being established between said terminals when said switch device is in the conductive state, said fourth switch device being responsive to gating control signals for switching between said states;
    third connecting means for connecting said second terminal of said third switch device to said first terminal of said first switch device;
    fourth connecting means for connecting said second terminal of said fourth switch device to said first terminal of said second switch device;
    fifth connecting means for connecting said first terminals of said third and fourth switch devices to a second polarity terminal of said direct current source, said fifth connecting means including an inductance;
    means for sensing a parameter of said load and generating timing control signals commensurate therewith;
    means for generating periodic gating control signals at first and second frequencies for said switch devices, said first frequency being greater than said second frequency, said first frequency gating control signals being applied to said first and second switch devices and said second frequency gating control signals being applied to said third and fourth switch devices whereby the conductive state of said switch devices will be controlled to cause current to alternately flow through said load in opposite directions, said load current also flowing through said fifth connecting means inductance, said gating control signal generating means including pulse width modulator means for varying the duration of at least said first frequency gating control signals; and
    means for delivering said timing control signals to said pulse width modulator means of said gating control signal generating means.

2. The apparatus of claim 1 wherein the capacitive load is an electroluminescent lamp and wherein said sensing means includes a light responsive sensor, said light sensor generating a timing control signal which is commensurate with the intensity of the light produced by said lamp.

3. The apparatus of claim 1 wherein the capacitive load is an electroluminescent lamp and wherein said sensing means generates timing control signals commensurate with the voltage applied to the lamp.

4. The apparatus of claim 3 wherein said sensing means measures the lamp voltage at the load side of said inductance.

5. The apparatus of claim 1 wherein a said second frequency gating control signal is applied to said third and fourth switch devices during alternate half cycles of a signal at said second frequency and said apparatus further comprises:
    means for clamping said third and fourth switch devices in the conductive state during said alternate half-cycles.

6. The apparatus of claim 5 wherein the capacitive load is an electroluminescent lamp and wherein said sensing means includes a light responsive sensor, said light sensor generating timing control signals which is commensurate with the intensity of the light produced by said lamp.

7. The apparatus of claim 5 wherein the capacitive load is an electroluminescent lamp and wherein said sensing means generates timing control signals commensurate with the voltage applied to the lamp.

8. The apparatus of claim 7 wherein said sensing means measures the lamp voltage at the load side of said inductance.

9. The apparatus of claim 6 wherein said pulse width modulator means varies the duty cycle of said gating control signals at said first frequency in response to said timing control signals.

10. The apparatus of claim 8 wherein said pulse width modulator means varies the duty cycle of said gating controls at said first frequency in response to said timing control signals.

* * * * *